United States Patent
Welin et al.

(10) Patent No.: US 7,118,614 B2
(45) Date of Patent: Oct. 10, 2006

(54) AIR DRYER

(75) Inventors: Hans Welin, St Ibb (SE); Sven-Olof Larsson, Loddekopin (SE)

(73) Assignee: Haldex Brake Products AB, (SE)

( * ) Notice: Subject to any disclaimer, the term of this patent is extended or adjusted under 35 U.S.C. 154(b) by 140 days.

(21) Appl. No.: 10/805,859

(22) Filed: Mar. 22, 2004

(65) Prior Publication Data

US 2004/0258475 A1     Dec. 23, 2004

(30) Foreign Application Priority Data

Mar. 21, 2003   (SE)   .................... 0300763

(51) Int. Cl.
| B01D 50/00 | (2006.01) |
| B01D 53/04 | (2006.01) |
| B01D 53/26 | (2006.01) |

(52) U.S. Cl. .................... 96/132; 96/133; 96/136; 55/DIG. 17; 34/80

(58) Field of Classification Search .............. 96/121, 96/130–140, 147, 149, 151–154; 55/DIG. 17; 34/80

See application file for complete search history.

(56) References Cited

U.S. PATENT DOCUMENTS

| 2,698,061 | A | * | 12/1954 | Jaubert | 96/136 |
| 3,353,339 | A | * | 11/1967 | Walter | 96/137 |
| 3,527,027 | A | * | 9/1970 | Knight et al. | 96/134 |
| 3,705,480 | A | * | 12/1972 | Wireman | 96/117.5 |
| 3,724,177 | A | | 4/1973 | Grote | 55/316 |
| 3,876,400 | A | * | 4/1975 | Frantz | 96/113 |
| 4,121,916 | A | | 10/1978 | Fricke | 55/316 |
| 4,259,097 | A | * | 3/1981 | Patel et al. | 96/136 |
| 4,478,619 | A | | 10/1984 | Arends et al. | 55/316 |
| 4,764,189 | A | * | 8/1988 | Yanagawa et al. | 96/114 |
| 5,002,593 | A | * | 3/1991 | Ichishita et al. | 96/137 |
| 5,236,064 | A | * | 8/1993 | Wagoner | 184/6.3 |
| 5,385,592 | A | * | 1/1995 | Maeda | 55/323 |
| 5,427,609 | A | * | 6/1995 | Zoglman et al. | 95/98 |
| 5,607,500 | A | * | 3/1997 | Shamine et al. | 96/144 |
| 5,846,271 | A | * | 12/1998 | Flynn et al. | 55/315 |
| 5,888,259 | A | * | 3/1999 | Maeda | 55/323 |
| 6,019,822 | A | * | 2/2000 | Kanzawa et al. | 96/8 |
| 6,071,321 | A | * | 6/2000 | Trapp et al. | 55/318 |
| 6,159,259 | A | * | 12/2000 | Maeda | 55/323 |
| 6,641,633 | B1 | * | 11/2003 | Witengier | 55/319 |
| 2002/0194991 | A1 | * | 12/2002 | Olsson et al. | 95/118 |
| 2004/0016342 | A1 | | 1/2004 | Fornof et al. | 95/117 |

FOREIGN PATENT DOCUMENTS

| EP | 0 102 593 | 8/1983 |
| EP | 0 242 171 | 4/1987 |
| WO | WO 94/26569 | 11/1994 |
| WO | WO 01/26783 | 4/2001 |

OTHER PUBLICATIONS

European Search Report; Jul. 29, 2004; 1 page.

* cited by examiner

*Primary Examiner*—Frank M. Lawrence
(74) *Attorney, Agent, or Firm*—St. Onge Steward Johnston & Reens LLC

(57) ABSTRACT

An air dryer comprises a base member, a main cartridge and an intermediate cartridge. The air dryer is capable of drying and possibly filtering and/or cleaning air passing there through. The intermediate cartridge, capable of drying and possibly filtering and/or cleaning air passing there through, is arranged between the base member and the main cartridge.

16 Claims, 2 Drawing Sheets

AIR DRYER

This application claims priority from pending Swedish Patent Application No. 0300763-0 filed on Mar. 21, 2003.

FIELD OF THE INVENTION

The present invention relates to an air dryer, comprising a base member and a main cartridge attached thereto and containing means for drying and possibly filtering and/or cleaning air passing there through. It also relates to an intermediate cartridge for such an air dryer.

BACKGROUND OF THE INVENTION

An air dryer of the above kind is used, for example on a heavy road vehicle, for drying compressed air delivered from a compressor. The cartridge, here called the main cartridge, may for example contain silica gel with small pores for the drying function, and such a cartridge is available on the market, also as a spare part.

It may, however, be desirable with a more complex treatment of the compressed air for improving its quality, before it is transferred to different consumers, where the air quality is of essence.

SUMMARY OF THE INVENTION

In an air dryer as defined above, this may be accomplished in that an intermediate cartridge, containing means for drying and possibly filtering and/or cleaning air passing there through, is arranged between the base member and the main cartridge.

Such an intermediate cartridge can accordingly supplement the main cartridge for improving the quality of the treated air, still allowing the main cartridge to be used and not necessitating any design changes.

In order to make use of the intermediate cartridge the main cartridge is dismounted from the base member, the intermediate cartridge mounted thereon, and the main cartridge again mounted on top of the intermediate cartridge.

If the main cartridge contains silica gel with fine pores, which is the case in a commercially available cartridge, the intermediate cartridge may in one embodiment of the invention contain a pre-filter and silica gel with large pores for the air flow before the main cartridge and molecular sieve and a fine filter for the air flow after the main cartridge.

BRIEF DESCRIPTION OF DRAWINGS

The invention will be described in further detail below under reference to the accompanying drawings, in which.

DETAILED DESCRIPTION OF EMBODIMENTS

Figure 1:
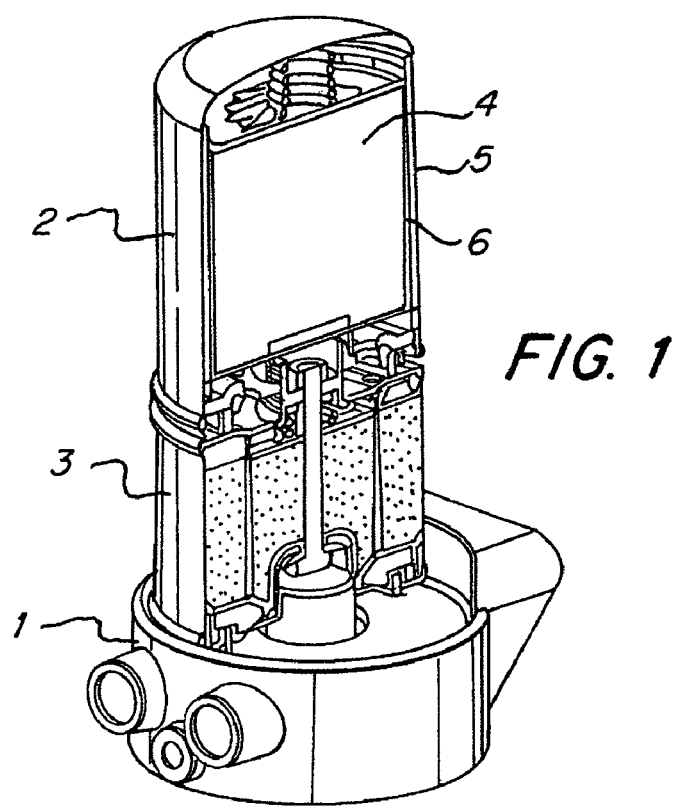
FIG. 1 is a perspective view, partly in section, of an air dryer with a device according to the invention.

As is well known in the art, a conventional air dryer basically comprises a base member 1 and mounted thereon a cartridge 2 containing air drying means, hereinafter called a main cartridge. According to the present invention an intermediate cartridge 3 is provided between the base member 1 and the main cartridge 2.

In a non-limiting, exemplary embodiment, the main cartridge 2 contains silica gel with fine pores 4 in a container 5. In the main cartridge 2 air to be dried is transferred from its bottom to its top in an annular slot 6 outside the container 5 and flows down to its bottom through the silica gel with fine pores 4. The dried air leaves the main cartridge 2 at its center portion.

Normally, this commercially available main cartridge 2 is threadingly attached directly on the base member 1, which contains means for directing the air flow into the main cartridge 2 and for receiving the dried air therefrom.

Figure 2:
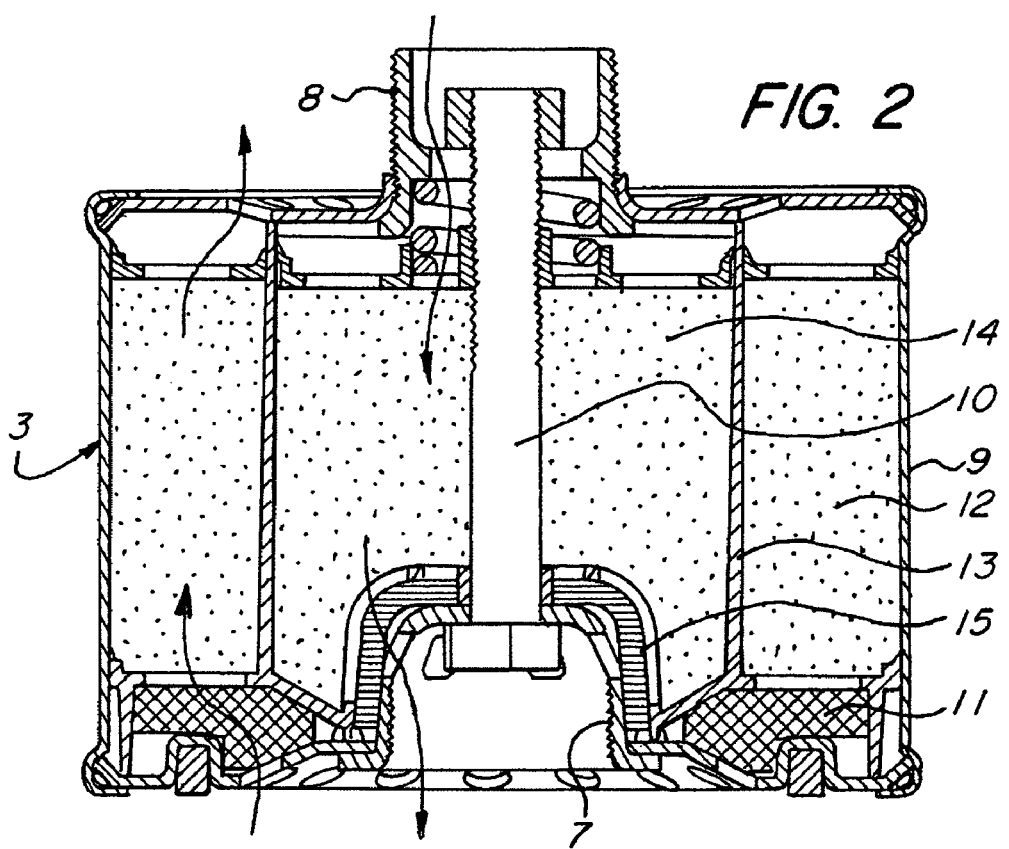
FIGS. 2–4 are sections to a larger scale through three embodiments of a device according to the invention.

An intermediate cartridge 3, which is shown in greater detail in FIG. 2, can according to the invention be arranged between the base member 1 and the main cartridge 2. For this purpose, it is provided with a central internal thread 7 in its bottom portion (for cooperation with a corresponding external thread in the base member 1) and a central external thread 8 in its upper portion (for cooperation with a corresponding internal thread in the main cartridge 2).

Hereby, the intermediate cartridge 3 can be screwed on the base member 1, whereupon the main cartridge 2 can be screwed on the intermediate cartridge 3.

The internal design of the intermediate cartridge 3 will not be described in detail, as it is of less significance for a proper understanding of the invention and is a matter of choice for a person skilled in the art. It is sufficient to note that an outer cylindrical housing 9 of the intermediate cartridge 3 shall be able to withstand at least the same internal pressure as the housing of the main cartridge 2 and that its internal parts are held together by a central screw 10 in this specific embodiment.

The air flow through this non-limiting, exemplary intermediate cartridge 3 is indicated in FIG. 2. Air flows in from the base member 1 (not shown in FIG. 2) through a ring-shaped pre-filter 11 and up through an annular compartment inside the cylindrical housing 9 containing silica gel with large pores 12.

The air then leaves the intermediate cartridge 3 and enters the main cartridge 2, described above. The air again enters the intermediate cartridge 3 at its top center after having passed the silica gel with fine pores 4 in the main cartridge 2.

The central compartment of the intermediate cartridge 3, separated from said annular compartment by a cylindrical dividing wall 13, contains desiccant or molecular sieve 14.

Before the air leaves the intermediate cartridge 3 at its bottom center and enters the base member 1 (not shown in FIG. 2), it passes a fine filter 15.

The pre-filter 11 will prevent larger particles, water, and liquids from passing.

The silica gel with large pores 12 will prevent larger carbon compounds and other chemical compounds from passing and will take up water in liquid form; also the molecular sieve (vide below) will be protected against chemical decomposition.

The silica gel with fine pores 4 will prevent smaller carbon compounds from passing and will take up water in vapor form; also the molecular sieve will be protected from exposure to free water.

The desiccant or molecular sieve 14 removes the remaining moisture from the air and lowers the dew point maximally.

The fine filter 15 takes up small particles generated in earlier portions of the aggregate air dryer.

Further information about the different stages and material in the air dryer assembly formed by the intermediate cartridge and the main cartridge may be obtained from WO 01/26783.

The embodiment described under reference to FIGS. 1 and 2 is just exemplary, as has been pointed out above. The basic thought to provide an intermediate cartridge between the base member and the main cartridge may be utilized in different embodiments depending on for example the content of the main cartridge. Without altering the design of the main cartridge the intermediate cartridge may provide an added treatment quality for the compressed air.

In this context, it may first be observed that the shown and described embodiment utilizes assembly based on thread engagement, which may be constructed in different ways. Other assembly means are equally feasible, such as a mounting ring cooperating with a lower flange of the main cartridge and attached by means of screw joints to the base member, as is well known in the art.

It is again to be emphasized that the contents and internal design of the intermediate cartridge may vary according to the specific requirements and the contents of the main cartridge. Two further embodiments are illustrated in FIGS. 3 and 4, which lack reference numerals for the sake of clarity.

Figure 3:
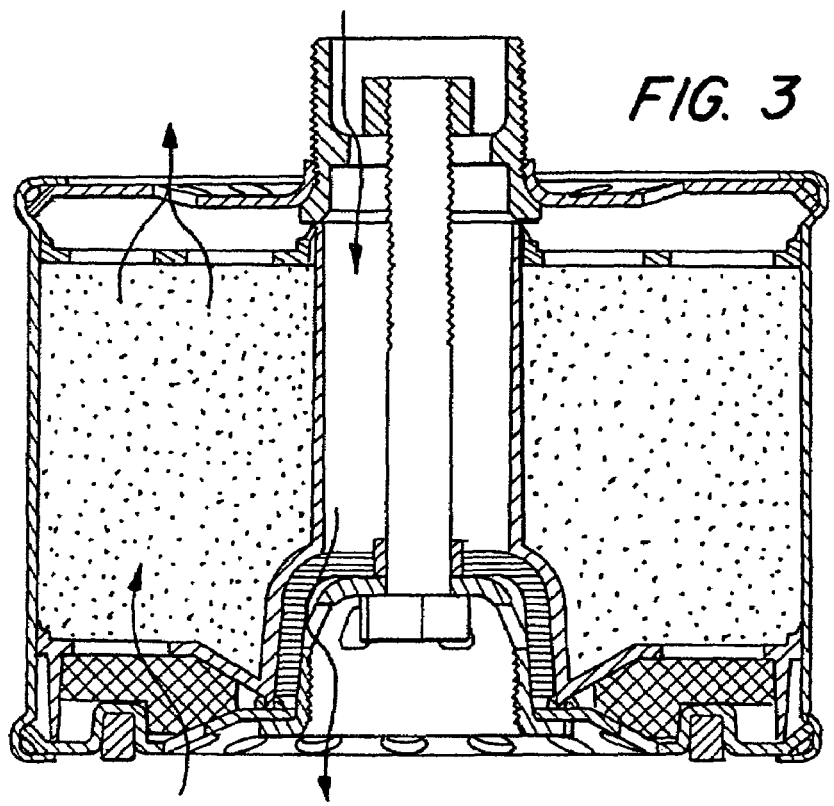

In the FIG. 3 embodiment the air from the base member passes the annular outer compartment through a filter and a cleaning and/or drying medium, before it enters the main cartridge. After having passed there through, it again enters the central compartment of the intermediate cartridge containing in this case only an outlet filter and returns to the base member.

Figure 4:
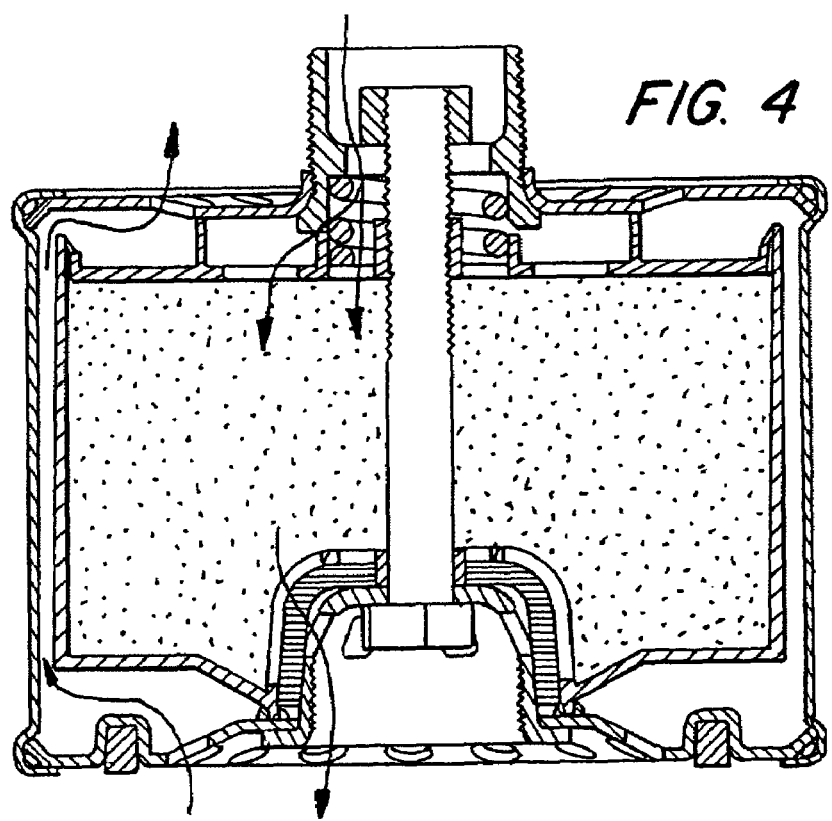

In the FIG. 4 embodiment air from the base member passes along the periphery of the intermediate cartridge without being treated and into the main cartridge. At its return through the intermediate cartridge to the base member it passes through a cleaning and/or drying medium and an outlet filter.

The invention claimed is:

1. An air dryer, comprising a base member, a main cartridge and an intermediate cartridge,
    wherein said base member comprises a first connector for removably connecting said base member to said main cartridge,
    wherein said main cartridge comprises a second connector for removably connecting said main cartridge to said base member through cooperation between the first connector and the second connector, and said main cartridge contains means for drying and possibly filtering and/or cleaning air passing there through,
    wherein said intermediate cartridge comprises a third connector for removably connecting said intermediate cartridge to said base member, the third connector being substantially identical to the second connector of said main cartridge,
    wherein said intermediate cartridge further comprises a fourth connector for removably connecting said intermediate cartridge to said main cartridge, the fourth connector being substantially identical to the first connector of said base member,
    and wherein said intermediate cartridge contains means for drying and possibly filtering and/or cleaning air passing there through and is arranged between the base member and the main cartridge.

2. An air dryer according to claim 1, wherein the means for drying and possibly filtering and/or cleaning air in the intermediate cartridge are arranged to complement and/or supplement the means for drying and possibly filtering and/or cleaning air in the main cartridge.

3. An air dryer according to claim 1, wherein the intermediate cartridge is arranged to be fastened by corresponding means as the main cartridge to the base member.

4. An air dryer according to claim 3, wherein the intermediate cartridge is provided with a central internal thread in its bottom portion for cooperation with a corresponding external thread in the base member and a central external thread in its upper portion for cooperation with a corresponding internal thread in the main cartridge.

5. An air dryer according to claim 2, wherein the main cartridge contains silica gel with fine pores or molecular sieve and the intermediate cartridge contains a pre-filter and silica gel with large pores for the air flow before the main cartridge and molecular sieve and a fine filter for the air flow after the main cartridge.

6. An air dryer according to claim 5, wherein the silica gel with large pores is arranged in an annular outer compartment of the intermediate cartridge and the molecular sieve in a cylindrical central compartment thereof.

7. An intermediate cartridge adapted for use in an air dryer having a base member having a first connector and a main cartridge connectible thereto and having a second connector and containing means for drying and possibly filtering and/or cleaning air passing there through,
    said intermediate cartridge comprising a third connector for removably connecting said intermediate cartridge to the base member, the third connector being substantially identical to the second connector of the main cartridge,
    said intermediate cartridge further comprising a fourth connector for removably connecting said intermediate cartridge to the main cartridge, the fourth connector being substantially identical to the first connector of the base member,
    wherein said intermediate cartridge contains means for drying and possibly filtering and/or cleaning air passing there through.

8. An intermediate cartridge according to claim 7, wherein the third connector comprises threading.

9. An intermediate cartridge according to claim 8, wherein the threading is central internal threading.

10. An intermediate cartridge according to claim 7, wherein the fourth connector comprises threading.

11. An intermediate cartridge according to claim 10, wherein the threading is central external threading.

12. An intermediate cartridge according to claim 7, wherein the means for drying and possibly filtering and/or cleaning air in said intermediate cartridge are arranged to complement and/or supplement the means for drying and possibly filtering and/or cleaning air in the main cartridge.

13. An intermediate cartridge according to claim 7, wherein said intermediate cartridge is arranged to be fastened by corresponding means as the main cartridge to the base member.

14. An intermediate cartridge according to claim 7, wherein said intermediate cartridge is provided with a central internal thread in its bottom portion for cooperation with a corresponding external thread in the base member and a central external thread in its upper portion for cooperation with a corresponding internal thread in the main cartridge.

15. An intermediate cartridge according to claim 7, wherein said intermediate cartridge contains a pre-filter and silica gel with large pores for air flow before the main cartridge and molecular sieve and a fine filter for air flow after the main cartridge.

16. An intermediate cartridge according to claim 15, wherein the silica gel with large pores is arranged in an annular outer compartment of said intermediate cartridge and the molecular sieve in a cylindrical central compartment thereof.

* * * * *